No. 681,358. Patented Aug. 27, 1901.
W. O. WEBBER.
PROCESS OF PREHEATING AND MOISTENING COMPRESSED AIR, &c.
(Application filed Nov. 20, 1900.)
(No Model.)

WITNESSES:
C. M. W. Smith.
Amy F. Williamson.

INVENTOR.
William O. Webber

UNITED STATES PATENT OFFICE.

WILLIAM O. WEBBER, OF BOSTON, MASSACHUSETTS, ASSIGNOR TO WALTER C. CARR, OF NEW YORK, N. Y.

PROCESS OF PREHEATING AND MOISTENING COMPRESSED AIR, &c.

SPECIFICATION forming part of Letters Patent No. 681,358, dated August 27, 1901.

Application filed November 20, 1900. Serial No. 37,172. (No specimens.)

*To all whom it may concern:*

Be it known that I, WILLIAM OLIVER WEBBER, of the city of Boston, county of Suffolk, and State of Massachusetts, have invented certain new and useful Improvements in Processes of Preheating and Moistening Compressed Air and other Fixed Gases; and I hereby declare that the following is a full, clear, and exact description of the same.

This process relates to the treatment of compressed air with heat and moisture to increase the elasticity thereof and to effect this increase in the passage of the air from a compressor to a motor. A single application of heat and moisture would cause the absorption by the air of a portion of its capacity for moisture, but not its maximum capacity, as to effect the latter result would require an extended treatment which could not be obtained in this passage of the air from a compressor to a motor. In order to impart a maximum degree of moisture to the air in the minimum of time, it becomes necessary to restore the air to its previously-heated condition as soon as the temperature thereof has been reduced by the application of moisture, and this result can only be effected by the progressive and successive moistening and heating action without permitting free expansion of the air or a material reduction in its temperature. As is well known, heated air under compression readily absorbs moisture and when thus moistened must be further heated to restore the same to a proper condition to receive the application of further moisture. If moisture be applied to heated air within a single chamber, the temperature of the air will be reduced, due to a partial evaporation of the moisture, and the further absorption of moisture prevented; but by reason of the successive steps this difficulty is avoided and the air is retained in proper condition to receive the maximum degree of moisture during a minimum period of time.

The accompanying drawings show one form of apparatus for carrying my process into effect, in which—

Figure 2:
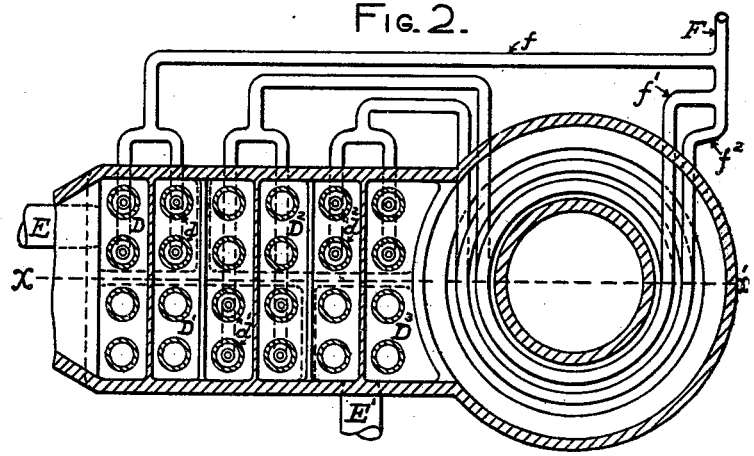
Figure 3:
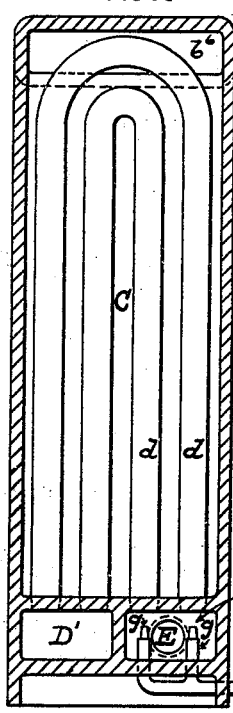
Figure 1:
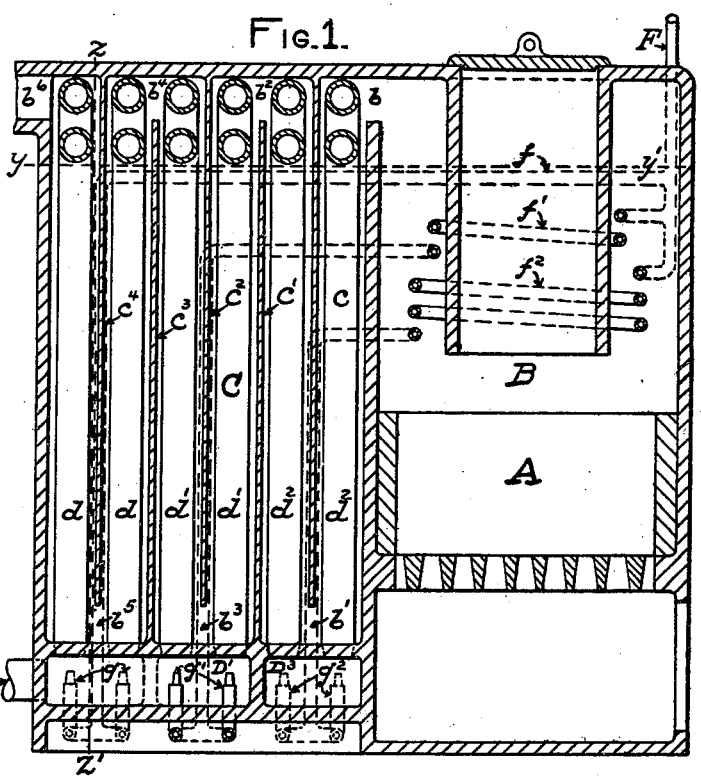

Figure 1 is a vertical cross-section on line $x x'$ of Fig. 2. Fig. 2 is a horizontal cross-section on line $y y'$ of Fig. 1, and Fig. 3 is a vertical cross-section on line $z z'$ of Fig. 1 looking toward the left-hand end of Fig. 1.

A is any suitable furnace; B, a combustion-chamber. Situated above said furnace, at the upper end of the combustion-chamber B, is a passage $b$, through which the heat and products of combustion from the furnace A pass to a heating-chamber C, which is provided with deflector-plates $c\ c'\ c^2\ c^3\ c^4$, alternately rising from the bottom and depending from the top of the chamber C and having air-passages $b'\ b^2\ b^3\ b^4\ b^5$, respectively, above and below the upper and lower ends thereof. Below this heat-chamber C are a series of air-chambers $D\ D'\ D^2\ D^3$. These air-chambers are operatively connected by inverted-U-shaped pipes $d\ d'\ d^2$, rising in groups of four and projecting upwardly into the heating-chamber C between the alternately-arranged deflector-plates $c\ c'\ c^2\ c^3\ c^4$. Air-inlet pipe E admits cold air to the chamber D, and an outlet-pipe E' allows the escape of the heated air from the chamber $D^3$. A water-supply pipe F is operatively connected to any suitable supply of water under pressure. One branch $f$ of this supply-pipe is introduced up through the bottom of the air-chamber D, where it terminates in four spray-nozzles $g$, vertically projecting into the vertical axes of the U-shaped pipes $d$ and immediately beneath the inlet-openings of these pipes. A second branch $f'$ of this water-supply pipe enters the combustion-chamber B, makes one complete convolution near the upper part thereof, and is then operatively connected to spray-nozzles $g'$ in the air-chamber D' in a similar manner and situation to those already described in chamber D. A third branch $f^2$ of the water-supply likewise enters the combustion-chamber B, makes two complete turns or convolutions around the combustion-chamber B at a point nearer to the furnace A than the pipe $f'$, and is then operatively connected to spray-nozzles $g^2$ in the air-chamber $D^2$, as previously described.

The operation of this apparatus in carrying out my process is as follows: The hot products of combustion arising from a fire in the furnace A rise to the upper part of the combustion-chamber B and pass out through the opening $b$ to the heating-chamber C, passing down under the deflector-plate $c$, through the passage $b'$, up over the plate $c'$, through the opening $b^2$, so on alternately down and up through the passages $b^2\,b^3\,b^4\,b^5$, and finally passing out through the opening $b^6$ to the atmosphere by means of a chimney or stack. Air under pressure is admitted through the opening E into the air-chamber D, passes upward and downward through the inverted-U tubes $d$ to the air-chamber D'. Heat is communicated to the compressed air during this passage by radiation through the walls of the U-tubes $d$, whose outer walls are in contact with the heated products of combustion passing around them. Moisture is simultaneously introduced into the compressed air in a fine spray through the spray-nozzles $g$, which inject moisture directly into the ascending column of compressed air and also tends to accelerate the flow of the compressed air through the inverted-U tubes. The compressed air after being thus partially moistened and simultaneously heated on entering the ascending legs of the inverted-U tubes $d$ is further heated by passing downward through the descending legs of these same tubes, thereby restoring to the compressed air any loss of heat due to the evaporation of the moisture introduced into the compressed air in the ascending columns, and the further heating of the air in the descending columns renders the absorption of further moisture more rapid and complete. The compressed air then passes upward through the ascending legs of the inverted-U tubes $d'$, is further moistened by the introduction of heated water through the spray-nozzles $g'$ simultaneously, and further heated in passing through the U-tubes $d'$, as before. These U-tubes $d'$ being nearer the furnace A are in contact with the products of combustion, therefore, at a higher temperature, and the moisture introduced through the nozzles $g'$ is at a higher temperature owing to its being supplied through the pipe $f'$, which passes through the combustion-chamber B of the furnace A. The compressed air then passes into the air-chamber D$^2$ and rises through the ascending legs of the inverted-U tubes $d^2$, receiving further moisture at a still higher temperature through the spray-nozzles $g^2$, these nozzles being supplied through the pipe $f^2$, which also passes through the combustion-chamber B, but with a greater number of convolutions and nearer to the furnace A than the pipe $f'$. The thus moistened and compressed air is then simultaneously and further heated in passing through the inverted-U tubes $d^2$, which are situated next to the furnace A and are brought in contact with the gases therefrom before they have had an opportunity to part with any of their heat, the now thoroughly moistened and heated air passing through the air-chamber D$^3$ and outlet E' to the motor or engine in which its expansive energy is to be utilized.

In this apparatus I have described a process of moistening and heating compressed air by three progressive stages only; but I do not wish to confine myself to this number of progressions, as it is obvious that a two-stage progression would have a similar result in a less degree and that more than three progressions would have a similar result in a much greater degree.

One pound of air will absorb .58 of a pound of moisture when given sufficient time. It has been found by experiment that bubbling compressed air up through a body of hot water or passing the compressed air through a vessel containing steam or introducing a steam-jet into a current of compressed air does not cause the compressed air to absorb moisture and heat as readily and as fully as though moisture were introduced into the compressed air in a fine spray at practically the same temperature as the air and simultaneously heat were applied thereto, or, again, by following up the first introduction of moisture and heat by a further introduction of moisture and a simultaneous further application of heat at an increased temperature without permitting the free expansion of the compressed air. The amount of moisture and heat which can be imparted to compressed air by repeated applications progressively applied is largely increased beyond the amounts which can be supplied in a given length of time with only one application of the heat and moisture attempted, because upon the introduction of moisture to air evaporation of the moisture in a greater or less degree immediately takes place. This evaporation causes a lowering of the temperature of the air and a partial condensation of the moisture. If now additional heat is immediately supplied, reëvaporation takes place, and if the heating is further and continuously supplied no further condensation can occur and the air will carry off all of the moisture which has been imparted to it and if still further and continuously heated will attract further contributions of moisture. My process therefore involves the heating of compressed air progressively and also the introduction of moisture in finely-divided particles into the compressed air at the same time and progressively as the heating of the air is accomplished, followed by the introduction of further moisture simultaneously with a further increase of temperature progressively applied, said simultaneous moistening and heating being immediately successive—that is, after the first introduction of moisture and simultaneous increase of temperature of compressed air subsequently and progressively supplying additional greater amounts of moisture and further amounts of heat at progressively higher temperatures without permitting the free expansion of the compressed air or a reduction in the temperature thereof.

I am well aware that the preheating of compressed air before using it in motors has been in use before for some time; also, that the moistening of compressed air previous to its being used is old; but What I desire to claim and secure by Letters Patent of the United States is as follows:

1. The process of moistening and heating compressed air or other fixed gas consisting of the introduction thereinto of moisture and simultaneously increasing the temperature thereof, followed by the further introduction of moisture and a simultaneous increase of temperature of the compressed air or other fixed gas, without permitting free expansion of the compressed air or other fixed gas or a reduction of the temperature thereof, substantially as described.

2. The process of moistening and heating compressed air or other fixed gases, consisting in the introduction of moisture thereinto and simultaneously increasing the temperature of the compressed air or other fixed gas, followed by the progressive introduction of further heated moisture simultaneous with a progressive increasing temperature of the compressed air or other fixed gas, said simultaneous moistening and heating being immediately successive, substantially as described.

3. The process of moistening and heating compressed air or other fixed gases, consisting in the introduction of moisture thereinto, and simultaneously increasing the temperature of said compressed air or other fixed gas, followed by the progressive introduction of further moisture at increasing temperatures, simultaneous with a progressive proportional increase of temperature of the compressed air or other fixed gas, without permitting free expansion of the compressed air or other fixed gas or a reduction of the temperature thereof, substantially as described.

4. The process of moistening and heating compressed air or other fixed gas consisting in the introduction of moisture thereinto and simultaneously increasing the temperature of said compressed air or other fixed gas, followed by the introduction of further moisture simultaneously with an increase of temperature of the compressed air or other fixed gas, said simultaneous moistening and heating being immediately successive and carried on progressively and by progressive stages, substantially as described.

In testimony whereof I have hereunto affixed my signature in the presence of two subscribing witnesses.

WILLIAM O. WEBBER.

Witnesses:
  WILLIAM ODLIN,
  J. W. CARROLL.